(12) United States Patent
Dirlam et al.

(10) Patent No.: US 11,306,192 B2
(45) Date of Patent: Apr. 19, 2022

(54) POLYLACTIDE FOAMS

(71) Applicant: Regents of the University of Minnesota, Minneapolis, MN (US)

(72) Inventors: Philip T. Dirlam, Minneapolis, MN (US); David J. Goldfeld, Minneapolis, MN (US); Marc A. Hillmyer, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 317 days.

(21) Appl. No.: 16/287,331

(22) Filed: Feb. 27, 2019

(65) Prior Publication Data
US 2019/0263989 A1   Aug. 29, 2019

Related U.S. Application Data

(60) Provisional application No. 62/636,050, filed on Feb. 27, 2018.

(51) Int. Cl.
| | | |
|---|---|---|
| *C08G 63/08* | (2006.01) | |
| *C08J 9/00* | (2006.01) | |
| *C08J 9/12* | (2006.01) | |

(52) U.S. Cl.
CPC ............ *C08J 9/0023* (2013.01); *C08J 9/122* (2013.01); *C08G 63/08* (2013.01); *C08J 2203/06* (2013.01); *C08J 2205/05* (2013.01); *C08J 2367/04* (2013.01)

(58) Field of Classification Search
None
See application file for complete search history.

(56) References Cited

U.S. PATENT DOCUMENTS

| | | | |
|---|---|---|---|
| 4,013,701 A | 3/1977 | Jabs | |
| 5,210,108 A | 5/1993 | Spinu | |
| 6,281,256 B1 * | 8/2001 | Harris | C08J 9/18 521/123 |
| 6,303,667 B1 | 10/2001 | Kruecke | |
| 6,444,720 B1 | 9/2002 | Klesczewski | |
| 7,199,082 B1 | 4/2007 | Chapman | |
| 8,013,031 B2 * | 9/2011 | Cink | C08J 9/122 521/97 |
| 9,138,308 B2 | 9/2015 | Schwab | |
| 9,540,777 B1 | 1/2017 | Tetrault | |
| 9,806,338 B2 | 10/2017 | Dai | |
| 2006/0246272 A1 * | 11/2006 | Zhang | B32B 5/18 428/304.4 |
| 2006/0265950 A1 | 11/2006 | Hale | |
| 2009/0270524 A1 * | 10/2009 | Oka | C08L 23/02 521/138 |
| 2013/0087560 A1 * | 4/2013 | Neuman | B32B 27/08 220/23.83 |
| 2016/0096942 A1 * | 4/2016 | Speer | C08G 63/60 521/56 |
| 2017/0258634 A1 | 9/2017 | de Juan | |
| 2021/0070957 A1 * | 3/2021 | Massouda | C08J 9/40 |

OTHER PUBLICATIONS

Brutman et al., "Polylactide Vitrimers", ACS Macro Letters, 3, 607-610, 2014.
Di et al., "Rheology in Processing of Polymeric Foams.", Annual Transactions of The Nordic Rheology Society, vol. 13, pp. 37-43, 2005.
International Search Report and Written Opinion in International Application No. PCT/US19/19779, dated Apr. 23, 2019, 14 pages.
Xu et al., "Foaming of Poly(lactic acid) Using Supercritical Carbon Dioxide as Foaming Agent: Influence of Crystallinity and Spherulite Size on Cell Structure and Expansion Ratio", Industrial and Engineering Chemistry Research, vol. 53, No. 6, pp. 2277-2286, 2015.
Extended European Search Report in European Appln No. 19761085. 0, dated Sep. 10, 2021, 6 pages.

\* cited by examiner

*Primary Examiner* — Melissa A Rioja
(74) *Attorney, Agent, or Firm* — Fish & Richardson P.C.

(57) ABSTRACT

A foam that includes a polylactide polymer in the form of a star polymer having at least three arms. The foam is an open cell foam having a density no greater than 0.1 g/cm$^3$.

25 Claims, No Drawings

POLYLACTIDE FOAMS

CROSS-REFERENCE TO RELATED APPLICATION

This application claims the benefit of U.S. Provisional Application No. 62/636,050, filed Feb. 27, 2018, the entire contents of which are hereby incorporated by reference.

TECHNICAL FIELD

This invention relates to polylactide foams useful, e.g., as floral foams.

BACKGROUND

Rigid, open cell foams are used as acoustic insulation, tissue scaffolds, and to fix floral arrangements in specific orientations. Floral foams must be sufficiently hydrophilic and rigid to support cut flower stems in a desired orientation, and to hold the stems in that orientation while supplying water to keep the stems rigid and the flowers from wilting. Current floral foams are typically polyurethane and phenolic foams prepared using an alkane blowing agent. The foaming process produces a crosslinked hydrophobic foam with trace formaldehyde that is then treated with a surfactant to allow for uptake of water into the entirety of the foam pore space. After use in a floral arrangement, the foam no longer absorbs water and is discarded, with limited options for recycling or reuse.

Poly(lactide) (PLA) is currently the most widely produced synthetic compostable polymer. There have been attempts to prepare linear PLA foams using $CO_2$ as a blowing agent. The foams produced using $CO_2$ as a physical blowing agent, however, are usually closed cell and are often brittle or rather dense (>0.2 $g/cm^3$). To address these deficiencies, long-chain branching by copolymerization of a multifunctional initiator or using one of a variety of chain extenders, usually a multi-epoxide (or similar functional group) containing small molecule additive, has been proposed. While previous attempts have achieved moderate success in the extrusion foaming of PLA, the chemical structure of the chain-extended PLA is often poorly defined.

SUMMARY

There is described a foam that includes a polylactide polymer in the form of a star polymer having at least three arms. The foam is an open cell foam having a density no greater than 0.1 $g/cm^3$. In some embodiments, the foam has a density no greater than 0.06 $g/cm^3$ or no greater than 0.04 $g/cm^3$. In some embodiments, the foam is in the form of a star polymer having at least four arms.

The foam may further include a polysorbate surfactant. Examples of suitable polysorbate surfactants include polysorbate 20 (prepared from lauric acid), polysorbate 40 (prepared from palmitic acid), polysorbate 60 (prepared from stearic acid), polysorbate 80 (prepared from oleic acid), and combinations thereof. Preferably, the polysorbate surfactant is present in an amount no greater than 5 wt. % based on the total weight of the foam.

The foam may further include a polyalkylene oxide block copolymer surfactant such as a polyethylene oxide-polypropylene oxide-polyethylene oxide triblock copolymers. Examples of suitable block copolymer surfactants include Poloxamer 188, Poloxamer 338, Poloxamer 403, and combinations thereof. Preferably, the polyalkylene oxide block copolymer surfactant is present in an amount of at least 7.5 wt. % based on the total weight of the foam. In some embodiments, the foam includes both a polysorbate surfactant and a polyalkylene oxide block copolymer surfactant.

In some embodiments, the foam has a water uptake relative to void volume of at least 25%, at least 30%, or at least 50%. The foam is useful as a floral foam. The foam is characterized in that when the stems of cut flowers are inserted into the foam, the flowers do not wilt for at least 48 hours after insertion. The foam can be rehydrated with the addition of 10 ml of water to increase flower longevity. When the stems of cut flowers are inserted into the foam, the flowers do not wilt for at least 132 hours with daily addition of 10 ml of water.

Also described is a method of preparing a foam that includes: (a) providing a foamable composition that includes a polylactide polymer in the form of a star polymer having at least three arms; and (b) introducing carbon dioxide into the foamable composition to create an open cell foam having a density no greater than 0.1 $g/cm^3$. The foamable composition may include one or more of the following agents: (1) a polysorbate surfactant; (2) a polyalkylene oxide block copolymer surfactant; (3) an agent selected from the group consisting of ethyl acetate, isopropanol, ethyl acetate, diethyl ether, and combinations thereof; (4) a plasticizer (e.g., isopropanol, ethyl lactate, or diethyl ether); and (5) a secondary blowing agent. The foamable composition may also include agents found in floral preservatives such as citric acid, sucrose, and biocide/mold inhibitors.

The foams offer a number of advantages. They are biodegradable and prepared from chemically sustainable feedstocks. Moreover, the foams are open-cell foams having low density and persistent wettability, making them particular useful as floral foams.

Details of one or more embodiments of the invention are set forth in the accompanying drawings and the description below. Other features, objects, and advantages of the invention will be apparent from the description and from the claims.

DETAILED DESCRIPTION

Open cell foams having a density no greater than 0.1 $g/cm^3$ (preferably no greater than 0.06 $g/cm^3$ or no greater than 0.04 $g/cm^3$) are prepared from foamable compositions that include a polylactide star polymer. The star polymer has at least three arms. In some embodiments, the star polymer has at least four arms. The star polymers are prepared via ring-opening transesterification polymerization of a lactide monomer as described generally in Brutman et al., Polylactide Vitrimers, *ACS Macro Letters* 2014, 3, 607-610. The lactide monomer may be a (+) lactide, a (−) lactide, or a ±(lactide).

As described in the Summary of the Invention, the foamable composition may contain additional ingredients. One example of a suitable additive is a surfactant such as a polysorbate surfactants. Polysorbate surfactants are commercially available surfactants made from the addition of hydrophilic polyethylene oxide chains onto a sorbitan backbone that is then coupled to a variety of hydrophobic fatty acids designated by a numerical identifier. Specific examples include polysorbate 20 (prepared from lauric acid), polysorbate 40 (prepared from palmitic acid), polysorbate 60 (prepared from stearic acid), and polysorbate 80 (prepared from oleic acid). Inclusion of the polysorbate surfactant in an amount no greater than 5 wt. %, based on the total weight of the foam, leads to low density foams that are coherent and homogeneous, and have consistent mechanical properties, including compressive strength.

Another example of a useful additive is a polyalkylene oxide block copolymer surfactant. Specific examples include polyethylene oxide-polypropylene-oxide-polyethylene oxide triblock copolymers suchas Poloxamer 188, Poloxamre 338, and Poloxamer 403. Inclusion of the surfactant directly in the foamable composition, in an amount of at least 7.5 wt. %, based on the total weight of the foam, leads to foams that are hydrophilic and, moreover, capable of absorbing water, drying out, and then reabsorbing the same mass of water.

Another example of a useful additive is a plasticizer or secondary blowing agent that extends the foam growth regime and softens the foam cell walls, thereby increasing the amount of water that the foam is capable of absorbing. The additive should be soluble in the polylactide foamable composition but sufficiently volatile such that after the foaming process is complete, the additive can be removed via vaporization. Representative examples include ethyl acetate, isopropanol, ethyl lactate, and diethyl ether. The amount of additive preferably is no greater than 5 wt. % based on the total weight of the foamable composition.

The foams are prepared by combining the polylactide star polymer and any additives to form a foamable composition. A blowing agent such as carbon dioxide is then introduced into the foamable composition to form the foam. The foaming operation typically takes place at relatively mild temperatures, e.g., at a temperature of no greater than 50° C.

EXAMPLES

Materials (±)-Lactide (Altasorb) was recrystallized two times from toluene prior to use. Tin(II) 2-ethylhexanoate ($Sn(Oct)_2$) (Sigma Aldrich) was distilled under reduced pressure prior to use. Dry toluene and dry dichloromethane were obtained from a solvent purification system (Pure Process Technology). Pentaerythritol (99%, Sigma-Aldrich), 1,1,1-tris(hydroxymethyl)propane (>98%, Sigma-Alrdich), benzyl alcohol (99%, Sigma Aldrich), 1,8-diazabicyclo[5.4.0]undec-7-ene (DBU, 98%, Sigma-Aldrich), polysorbate 20, 40, 60, 80 (Alfa-Aesar) and Poloxamer 188 (Pluronic F68, Anatrace) were commercially available and used as received. All solvents including methanol, hexanes, dichloromethane and ethyl acetate were commercially available and used as received.

Instrumentation and Methods

Size exclusion chromatography (SEC) was performed in a chloroform mobile phase with an Agilent 1100 series liquid chromatograph with an HP 1047A differential refractometer running three Agilent PLgel 5 μm Mixed-C columns at 35° C. and a flow rate of 1 mL/min.

Molar masses were calculated using ChemStation software (Agilent), calibrated against low dispersity linear polystyrene standards. $^1$H NMR spectroscopy was conducted with a Bruker Avance III HD 400 in $CDCl_3$, chemical shifts are reported relative to residual protio chloroform signal (7.26 ppm). Molar mass was estimated as the product of the repeat unit molar mass and degree of polymerization determined via end group analysis utilizing the terminal methine signal (4.35 ppm) as an internal standard to calculate the degree of polymerization relative to the polymer signal (5.2 ppm).

Differential scanning calorimetry was conducted on a TA Instruments Q-1000 DSC under nitrogen. Samples were analyzed in hermetically sealed aluminum pans. Samples were subjected to two cycles of heating from 0° C. to 160° C. and then cooling to 0° C. at 10° C./min. Glass transitions are reported as determined from the second heating cycle as the inflection point.

Foam density was calculated by determining the volume of cylindrical foam samples by measuring the dimensions with a caliper or via water displacement for samples with poorly defined shape and dividing by the mass. Foam void volume ($V_{void}$) was determined as the difference between the measured foam volume ($V_{foam}$) and the volume of poly (lactide) (or poly(lactide)/surfactant blend) ($V_{PLA}$) comprising the structure of the foam sample as determined from the foam mass and assuming a density of 1.25 g/cm$^3$ (i.e. $V_{void}=V_{foam}-V_{PLA}$).

Compression testing was conducted on a Shimadzu Autograph AGS-X equipped with two parallel stainless steel plates at a uniaxial compression rate of 1 mm/min on cylindrical foam samples with D=1.021 cm and H≈1 cm compressed parallel to the direction of foam rise. Compressive strength was calculated with Trapezium software by taking the stress at 10% strain.

Synthesis of 4-Arm Star PLA

The bulk polymerization of (±)-lactide to afford 4-arm star PLA was conducted according to a procedure adapted from Brutman et al., Polylactide Vitrimers, *ACS Macro Letters* 2014, 3, 607-610. The following is a specific example of the general procedure used for the preparation of 4-arm star PLA.

To a 300 mL pressure vessel equipped with a magnetic stir bar was successively added pentaerythritol (310 mg, 2.28 mmol), (±)-lactide (80.0 g, 0.555 mol), and a 25 mM solution of $Sn(Oct)_2$ in dry toluene (0.8 mL, 20 mmol $Sn(Oct)_2$). The pressure vessel was sealed and the bottom portion of the reaction vessel was submerged in an oil bath at 160° C. and stirred for ca. 15 min to allow for melting and mixing of the initiator and a portion of the lactide. Then, after the solution of initiator and (±)-lactide turned clear, the reaction vessel was submerged further and heated at 160° C. with stirring for 3 hours.

The crude polymer was allowed to cool to room temperature, dissolved in dichloromethane, and then precipitated into an excess of methanol. The supernatant was decanted and the precipitate was dissolved in dichloromethane. The polymer was then precipitated a second time into an excess of hexanes. The supernatant was decanted and the precipitate was dissolved in a minimal amount of dichloromethane and transferred to a polypropylene container. The solution was concentrated under a stream of nitrogen and then placed in a vacuum oven at 60° C. for a minimum of 16 hours to remove residual solvent, yielding a clear, colorless glass in 88% isolated yield. $^1$H NMR (400 MHz, $CDCl_3$; 25° C.): δ (ppm)=5.2 [bm, —$COCH(CH_3)O$—], 4.35 [m, —COCH($CH_3$)OH end group], 4.15 [bs, $C(CH_2)_4$-pentaerythritol], 1.56 [bm, —$COCH(CH_3)O$—], $M_n$=44.0 kg/mol SEC ($CHCl_3$): $M_n$=50.5 kg/mol, Đ=1.26. DSC: $T_g$=46° C.

Preparation of Foams

The following is a specific example of the general procedure used to prepare PLA and PLA/surfactant blend foams. For samples prepared without surfactant additions, the PLA was utilized without the initial solvent casting steps described in the following.

To a polypropylene jar equipped with a magnetic stir bar was added polysorbate 80 (100 mg), poloxamer 188 (100 mg), (poly((±)-lactide) (1.8 g), and dichloromethane (10 mL). The mixture was stirred until homogeneous and the stir bar was then removed. The solution was concentrated under a stream of nitrogen and then placed in a vacuum oven at 60° C. for a minimum of 8 hours to remove residual solvent.

The polypropylene container with PLA or solvent cast PLA/surfactant blend was then loaded into a 1 L stainless steel pressure vessel. The vessel was sealed, charged with $CO_2$ (0.7 MPa, gauge pressure), and vented to atmospheric pressure. This was repeated a total of three times to purge the pressure vessel with $CO_2$. The pressure vessel was then heated to the desired temperature with a water bath and subsequently pressurized with $CO_2$ (6 MPa, gauge pressure). The sample was incubated under $CO_2$ at the desired temperature for 5 hours. The vessel was then rapidly depressurized to atmospheric pressure (2.3 MPa/s) through a ball-valve outlet with inner diameter of 4.7 mm and the expanded polymer sample was removed from the pressure vessel. To obtain samples with well-defined dimensions for density and compressive strength testing, cylindrical samples were extracted from larger foams using a cork borer tool.

TABLE 1

Result of $CO_2$ Foaming Procedure on PLA with Various Molar Masses

| Architecture | $M_n$ (SEC, kg/mol) | Arm $M_n$ (kg/mol) | Result of $CO_2$ Treatment | Density of Expanded Sample (g/cm³) |
|---|---|---|---|---|
| Linear | 8.57 | 4.3 | No Significant Expansion | — |
| Linear | 16.5 | 8.3 | No Significant Expansion | — |
| Linear | 46.4 | 23.2 | Expansion | 0.21 |
| 3-Arm | 8.23 | 2.7 | Incoherent | — |
| 3-Arm | 16.2 | 5.4 | Incoherent | — |
| 3-Arm | 35 | 11.7 | Expansion | 0.10 |
| 3-Arm | 44.3 | 14.8 | Expansion | 0.11 |
| 3-Arm | 51 | 17.0 | Expansion | 0.09 |
| 4-Arm | 9.47 | 2.4 | Incoherent | — |
| 4-Arm | 17.2 | 4.3 | Incoherent | — |
| 4-Arm | 35.7 | 8.9 | Expansion | 0.10 |
| 4-Arm | 50.5 | 12.6 | Expansion | 0.10 |

*All samples were treated with 6 MPa (gauge pressure) $CO_2$ at ambient temperature for 5 hours with subsequent rapid depressurization.

Use as Floral Foams

Water uptake and delivery to cut flowers was tested through a time trial consisting of a flower stem (*Gerbera jamesonii*) cut at 45° angle and inserted 3 cm into a 100 cm³ foam sample. Two control flowers (one in a dry container and a second in 100 mL tap water) were placed alongside a flower in commercial floral foam and another in PLA base formulation foam, both foams soaked to saturation in tap water before flower insertion. The flowers were photographed every two hours to monitor both general appearance and rigidity of their stems.

The flower in air wilted within 6 hours. The flower in the commercial floral foam sample began to wilt after 36 hours. The flower in the PLA base formulation foam began to wilt after 48 hours, while the control in water did not wilt for more than 6 days.

To test the ability of the PLA based foam to rewet, water was added to both the commercial floral foam and the PLA base formulation foam. Rigidity returned to the stem in the PLA foam as it reabsorbed water and delivered it to the flower. The flower in commercial foam, which does not rewet after the initial water absorption removes the surfactant coating, remained wilted.

With the base formulation outperforming commercial floral foam in its hydration of cut flower stems and matching the mechanical properties, the synthesis was scaled up to make foam blocks large enough to hold a practical floral arrangement. Seven stems of a variety of flowers and decorative plants were inserted into a tap-water soaked 500 cm³ foam at <1 cm spacing at approximately 30° angles. This demonstrates that the four-arm star PLA-based formulations perform well as foams for the construction of decorative floral arrangements.

A number of embodiments of the invention have been described. Nevertheless, it will be understood that various modifications may be made without departing from the spirit and scope of the invention. Accordingly, other embodiments are within the scope of the following claims.

What is claimed is:

1. A foam comprising a polylactide polymer in the form of a star polymer having at least three arms, wherein the foam is an open cell foam having a density no greater than 0.1 g/cm³.

2. The foam of claim 1 wherein the foam has a density no greater than 0.06 g/cm³.

3. The foam of claim 1 wherein the foam has a density no greater than 0.04 g/cm³.

4. The foam of claim 1 wherein the foam further comprises a polysorbate surfactant.

5. The foam of claim 4 wherein the polysorbate surfactant is selected from the group consisting of polysorbate 20, polysorbate 40, polysorbate 60, polysorbate 80, and combinations thereof.

6. The foam of claim 4 wherein the polysorbate surfactant is present in an amount no greater than 5 wt. % based on the total weight of the foam.

7. The foam of claim 1 wherein the foam further comprises a polyalkylene oxide block copolymer surfactant.

8. The foam of claim 1 wherein the polyalkylene oxide block copolymer surfactant comprises a polyethylene oxide-polypropylene oxide-polyethylene oxide triblock copolymer surfactant.

9. The foam of claim 1 wherein the polyalkylene oxide block copolymer surfactant is selected from the group consisting of Poloxamer 188, Poloxamer 338, Poloxamer 403, and combinations thereof.

10. The foam of claim 7 wherein the polyalkylene oxide block copolymer surfactant is present in an amount at least 7.5 wt. % based on the total weight of the foam.

11. The foam of claim 1 wherein the foam further comprises a polysorbate surfactant and a polyalkylene oxide block copolymer surfactant.

12. The foam of claim 1 wherein the star polymer has at least four arms.

13. The foam of claim 1 wherein the foam has a water uptake relative to void volume of at least 25%.

14. The foam of claim 1 wherein the foam has a water uptake relative to void volume of at least 30%.

15. The foam of claim 1 wherein the foam has a water uptake relative to void volume of at least 50%.

16. The foam of claim 1 characterized in that when stems of cut flowers are inserted into the foam, the flowers do not wilt for at least 48 hours after insertion.

17. The foam of claim 1 characterized in that the foam can be rehydrated with the addition of 10 ml of water.

18. The foam of claim 1 characterized in that when stems of cut flowers are inserted into the foam, the flowers do not wilt for at least 132 hours with daily addition of 10 ml of water.

19. A foam comprising (a) a polylactide polymer in the form of a star polymer having at least three arms, (b) a polysorbate surfactant in an amount no greater than 5 wt. % based on the total weight of the foam, and (c) a polyalkylene oxide block copolymer in an amount no greater than 7.5 wt. % based on the total weight of the foam, wherein the foam is an open cell foam having a density no greater than 0.06 $g/cm^3$.

20. A method of preparing a foam comprising:
   (a) providing a foamable composition comprising a polylactide polymer in the form of a star polymer having at least three arms; and
   (b) introducing carbon dioxide into the foamable composition to create an open cell foam having a density no greater than 0.1 $g/cm^3$.

21. The method of claim 20 wherein the foamable composition further comprises a polysorbate surfactant.

22. The method of claim 20 wherein the foamable composition further comprises a polyalkylene oxide block copolymer surfactant.

23. The method of claim 20 wherein the foamable composition further comprises an agent selected from the group consisting of ethyl acetate, isopropanol, ethyl lactate, diethyl ether, and combinations thereof.

24. The method of claim 20 wherein the foamable composition further comprises a plasticizer.

25. The method of claim 20 wherein the foamable composition further comprises a secondary foaming agent.

* * * * *